United States Patent
Zhang et al.

(10) Patent No.: US 12,160,756 B2
(45) Date of Patent: Dec. 3, 2024

(54) SYSTEMS, METHODS, AND DEVICES FOR UNIFIED DEMODULATION IN WIRELESS COMMUNICATIONS DEVICES

(71) Applicant: Cypress Semiconductor Corporation, San Jose, CA (US)

(72) Inventors: Yanbing Zhang, Basking Ridge, NJ (US); Hongwei Kong, Basking Ridge, NJ (US); Patrick Cruise, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 536 days.

(21) Appl. No.: 17/475,773

(22) Filed: Sep. 15, 2021

(65) Prior Publication Data
US 2023/0079027 A1    Mar. 16, 2023

(51) Int. Cl.
*H04W 24/02*     (2009.01)
*H04L 49/90*     (2022.01)
*H04W 4/80*      (2018.01)
*H04W 56/00*     (2009.01)

(52) U.S. Cl.
CPC ............. *H04W 24/02* (2013.01); *H04L 49/90* (2013.01); *H04W 4/80* (2018.02); *H04W 56/001* (2013.01)

(58) Field of Classification Search
CPC ..... H04W 24/02; H04W 4/80; H04W 56/001; H04L 49/90
See application file for complete search history.

(56) References Cited

U.S. PATENT DOCUMENTS

2019/0007850 A1\* 1/2019 DenBoer ................. H04W 4/80
2022/0174597 A1\* 6/2022 Mudulodu ............ H04W 52/52

\* cited by examiner

*Primary Examiner* — Elton Williams

(57) ABSTRACT

Systems, methods, and devices perform unified demodulation operations for wireless communications devices. Methods may include receiving, at a buffer of a wireless communications device, a data packet, and performing, using a processing device, one or more synchronization operations based on one or more operational modes of a wireless communications protocol. Methods may additionally include identifying, using the processing device, a type of the data packet, configuring, using the processing device, a receive chain of the wireless communications device to perform a type of demodulation operation based on the identified type of the data packet.

20 Claims, 7 Drawing Sheets

SYSTEMS, METHODS, AND DEVICES FOR UNIFIED DEMODULATION IN WIRELESS COMMUNICATIONS DEVICES

TECHNICAL FIELD

This disclosure generally relates to wireless communications devices, and more specifically, to demodulation techniques associated with wireless communications devices.

BACKGROUND

Wireless communications devices may communicate with each other via one or more communications modalities, such as a WiFi connection or a Bluetooth connection. Accordingly, such wireless communication may be performed in a manner compliant with a wireless communications protocol. Moreover, such wireless communications devices may include various hardware components to facilitate such communication. For example, wireless communications devices may include transmission media and reception media that may include one or more antennas and transceivers. Conventional techniques for handling data transmissions between wireless communications devices and receiving data packets in accordance with various communications protocols and their operational modes remain limited because they are not able to efficiently perform demodulation techniques for such communications protocols having multiple operational modes.

DETAILED DESCRIPTION

Figure 1:
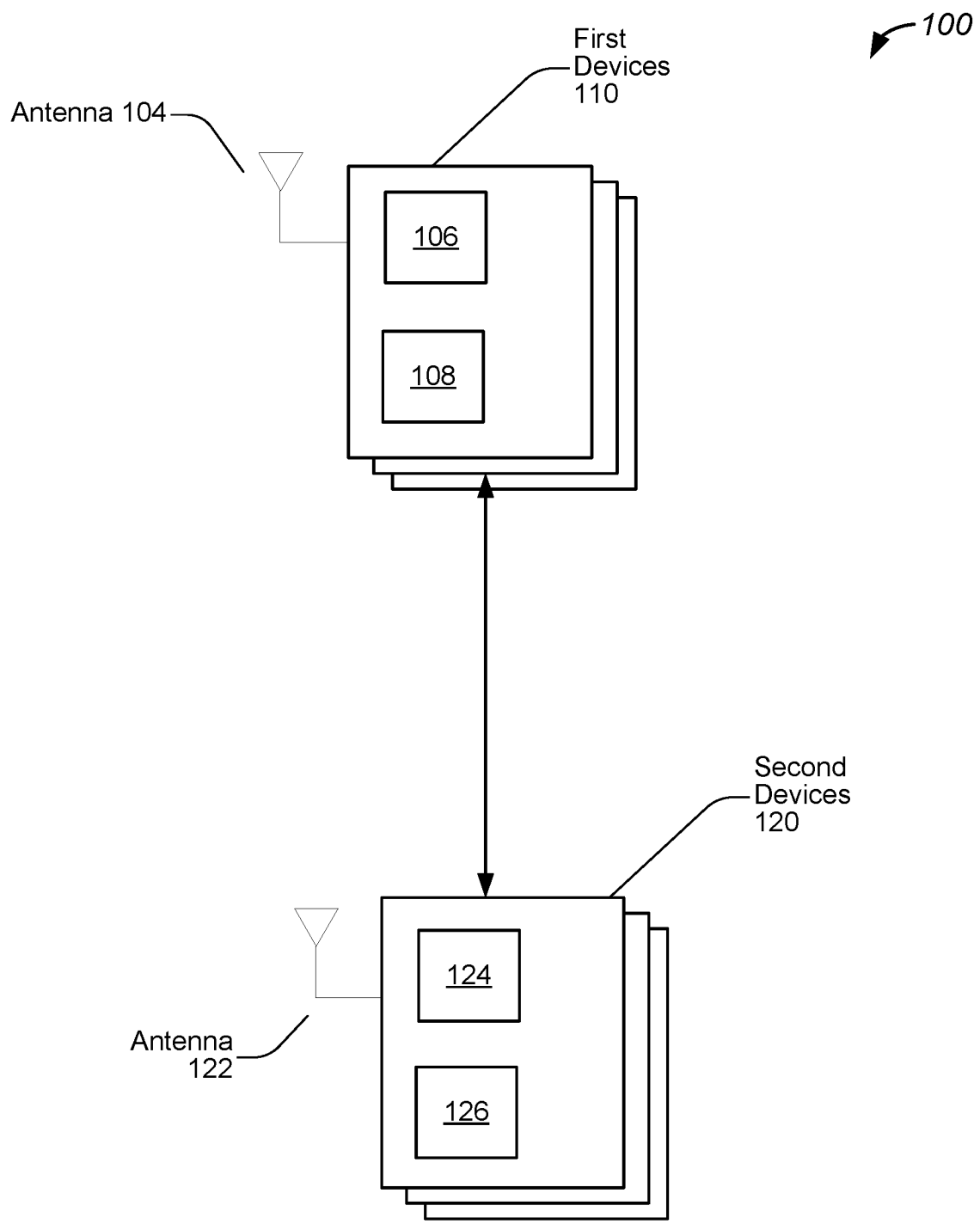
FIG. 1 illustrates an example of a system for demodulation for wireless communications devices, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless communications devices may utilize data packets when communicating with each other. Moreover, when demodulating and decoding received information, components of receive chains may handle different processing operations of demodulation processes. For example, a chain of components may handle receiving and demodulation operations for a first operational mode of a communications protocol, such as Bluetooth Low Energy, and another chain of components may handle receiving operations for a second operational mode of the communications protocol, such as Bluetooth Low Energy Long Range. However, conventional wireless communications devices utilize separate chains of components for each communications protocol or operational mode of a communications protocol. Accordingly, such implementations are inefficient and utilize a relatively large amount of system resources to implement multiple receive chains for such communications protocols and their operational modes.

Embodiments disclosed herein provide the ability to dynamically perform multiple demodulation operations in a unified and efficient manner. More specifically, components of a receive chain used to perform such demodulation operations may be selectively utilized to perform demodulation operations and decoding operations as appropriate, and dynamically in response to a determination of a type of data packet that has been received. As will be discussed in greater detail below, a receive chain may include components of a receiver included in a transceiver as well as an associated processing device that are used to receive, synchronize, demodulate, and decode a data packet. Accordingly, a receive chain may include components of a transceiver, such as an analog to digital converter and/or a sampling unit, as well as other components, such as a data packet synchronizer, a demodulator, and a decoder. Receive chains disclosed herein are configurable such that components may be selected dynamically based on an identified data packet type. In this way, a unified receive chain may be used for multiple demodulation and decoding operations.

Thus, according to various embodiments, a single unified receive chain may be implemented for multiple operational modes of a communications protocol, and components of the receive chain may be dynamically configured to implement the appropriate demodulation operations and decoding operations for a given operational mode. In this way, multiple dedicated receive chains are not needed, and overall hardware usage for implementation of such receive chains is reduced.

FIG. 1 illustrates an example of a system for demodulation for wireless communications devices, configured in accordance with some embodiments. As shown in FIG. 1, various wireless communications devices may communicate with each other via one or more wireless communications media. For example, wireless communications devices may communicate with each other via a Bluetooth connection. In various embodiments, the wireless communications devices may first establish connections or communications links before data transfer occurs. Once a communications link is established, packetized network traffic may be sent over a communications network. Accordingly, data packets may be sent and received between such wireless communications devices. As will be discussed in greater detail below, wireless communications devices disclosed herein and systems, such as system 100, that implement such wireless communications devices are configured to perform unified demodulation operations for multiple operational modes of a wireless communications protocol. Accordingly, embodiments disclosed herein enable the handling of demodulation for such different operational modes while reducing an amount of system resources used to handle such demodulation.

In various embodiments, system 100 may include first devices 110 which may be wireless communications devices. As discussed above, such wireless communications devices may be compatible with one or more wireless communications protocols, such as one or more Bluetooth protocols. In some embodiments, first devices 110 are low energy Bluetooth devices that are compatible with a Bluetooth Low Energy specification and protocol, also referred to as Bluetooth Smart. The Bluetooth Low Energy protocol may have multiple operational modes, such as Low Energy (LE) 1M, LE 2M, and LE Long Range (LELR). Moreover, such wireless communications devices may be smart devices, such as those found in wearable devices, or may be monitoring devices, such as those found in smart buildings, environmental monitoring, and energy management. For example, such devices may be industrial sensors, other sensors used in asset tracking, as well as any other suitable internet of things (IoT) device. Moreover, wireless communications devices may be any suitable device, such as those found in cars, other vehicles, and even medical implants.

As shown in FIG. 1, various wireless communications devices may be in communication with each other via one or more wireless communications mediums. As shown in FIG. 1, first devices 110 may each include an antenna, such as antenna 104. First devices 110 may also include processing device 108 as well as transceiver 106. As will be discussed in greater detail below, such processing devices, transceivers, and radios may be configured to send and receive data packets between each other, and utilize portions of data packets for the purposes of data packet detection and synchronization events. More specifically, as will be discussed in greater detail below, different components of first devices 110 may be configured to perform unified demodulation operations for multiple operational modes of a wireless communications protocol thus reducing an amount of system resources used to handle such demodulation.

In some embodiments, system 100 may further include second devices 120 which may also be wireless communications devices. As similarly discussed above, second devices 120 may be compatible with one or more wireless communications protocols, such as a Bluetooth protocol that may have multiple operational modes. Moreover, second devices 120 may also be smart devices or other devices, such as IoT devices, devices found in cars, other vehicles, and medical implants. In various embodiments, second devices 120 may be different types of devices than first devices 110. As discussed above, each of second devices 120 may include an antenna, such as antenna 122, as well as processing device 126 and transceiver 124, which may also be configured to establish communications connections with other devices, and transmit and receive data in the form of data packets via such communications connections. Accordingly, as discussed above, second devices 120 may also be configured to perform unified demodulation operations for multiple operational modes of a wireless communications protocol thus reducing an amount of system resources used to handle such demodulation.

Figure 2:
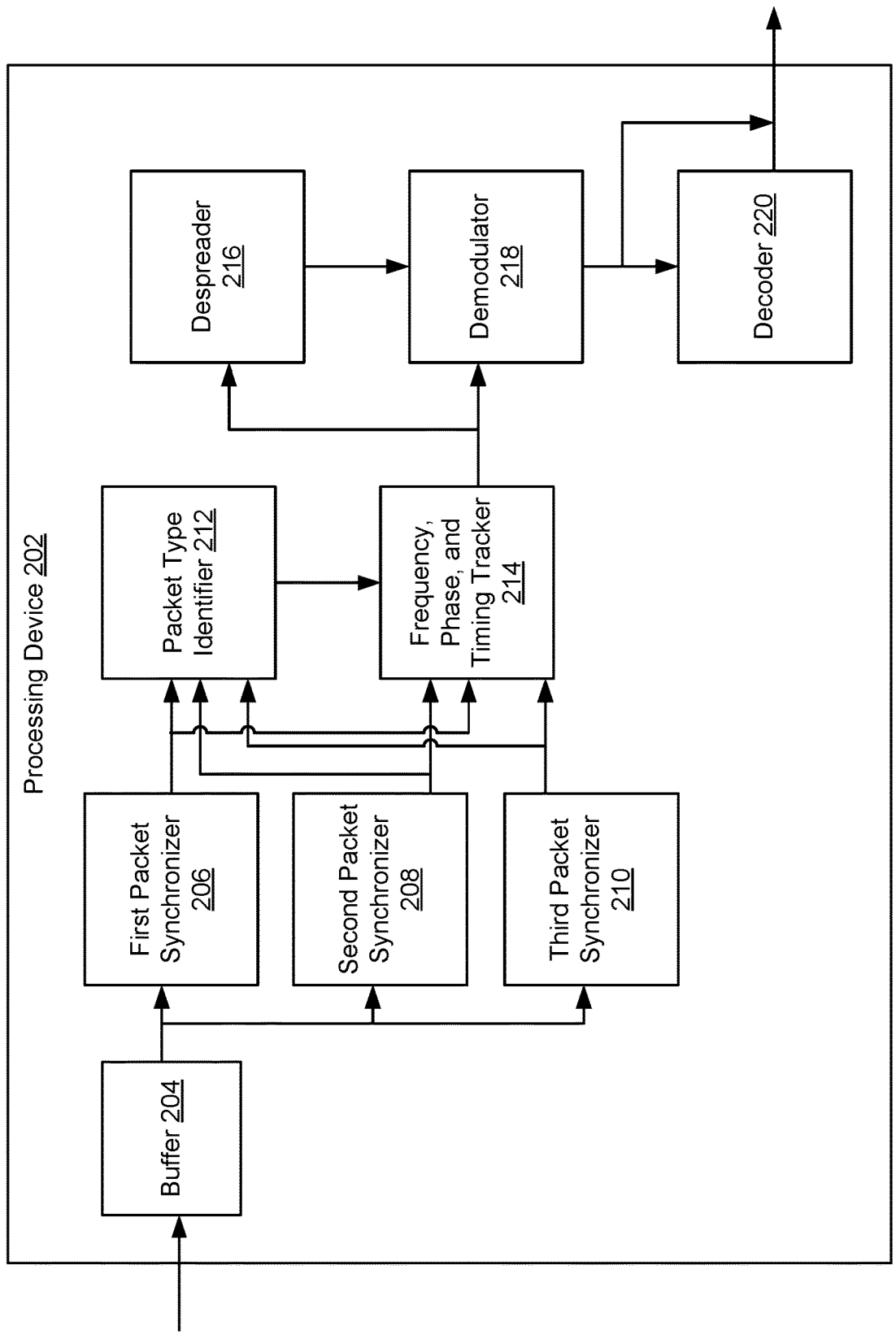
FIG. 2 illustrates an example of a device for demodulation for wireless communications devices, configured in accordance with some embodiments.

FIG. 2 illustrates an example of a device for demodulation for wireless communications devices, configured in accordance with some embodiments. As discussed above, wireless communications devices may include various components, such as processing devices that are configured to perform various operations associated with data packet reception, detection, synchronization, and demodulation. Accordingly, as will be discussed in greater detail below, a processing device, such as processing device 202, may be included in a wireless communications device, and may be configured to perform unified demodulation operations for multiple operational modes of a wireless communications protocol.

In some embodiments, processing device 202 includes buffer 204 which is configured to receive samples associated with an incoming data packet. Accordingly, buffer 204 may be a sample buffer that is configured to store digital signal samples taken by one or more components of a receive path of a transceiver. In some embodiments, buffer 204 is a memory configured to have an appropriate size and length of a storage location to store the received samples in a manner that may accommodate multiple operational modes of various communications protocols used to transmit the data packet. Accordingly, buffer 204 may be configured to store a portion of the data packet, such as an access code, for either a Bluetooth Low Energy data packet, a Bluetooth Low Energy Long Range data packet, or a Bluetooth Low Energy 2 data packet. As shown in FIG. 2, buffer 204 may receive one or more data values of the data packet, and may provide them to one or more packet synchronizers discussed in greater detail below.

Processing device 202 further includes one or more packet synchronizers, such as first packet synchronizer 206, second packet synchronizer 208, and third packet synchronizer 210. In various embodiments, packet synchronizers are configured to perform one or more data packet synchronization operations in accordance with an operational mode of a communications protocol, such as a Bluetooth communications protocol. Accordingly, a packet synchronizer may be configured to perform synchronization operations to synchronize timing values associated with received data packets, and some other temporal reference, such as a system clock. In some embodiments, packet synchronizers are configured to obtain a plurality of samples of received data at a given sampling rate. The samples may be used to compute a plurality of correlation values, where a plurality of correlation values is computed for each sample based on a plurality of shift values, and based on a comparison of the received, sampled data and a known data pattern used as a reference for synchronization purposes. For example, the known data pattern may be a designated sync pattern, such as a sync word. Samples may be taken of the received sync word and correlated with a reference sync word to generate correlation values corresponding to the each of the samples for the sync word. Accordingly, packet synchronizers may generate correlation values identifying how well received samples correlate with a reference data pattern. As will be discussed in greater detail below, synchronization operations may also include identifying a size of one or more sections or portions of a data packet.

In various embodiments, processing device 202 is configured to include a packet synchronizer for each operational mode of each communications protocol. For example, first packet synchronizer 206 may be configured to perform packet synchronization operations for a Bluetooth Low Energy operational mode. Moreover, second packet synchronizer 208 may be configured to perform packet synchronization operations for a Bluetooth Low Energy Long Range operational mode. Furthermore, third packet synchronizer 210 may be configured to perform packet synchronization operations for a Bluetooth Low Energy 2 operational mode. Accordingly, the packet synchronizers may receive data values from buffer 204, and may perform synchronization operations in accordance with their respective operational mode.

Processing device 202 additionally includes packet type identifier 212 that is configured to identify a packet type based on one or more packet parameters. In various embodiments, the packet type may be inferred based on one or more properties of the data packet itself, such as a size or a length of a portion of the data packet. For example, a size of the access code of the data packet may be used to infer a type of the data packet. Accordingly, packet type identifier 212 is configured to identify a type of data packet received based on the data values stored in buffer 204, and the type of data packet identified by packet type identifier 212 may be used to configured operation of the remaining components of the receive chain based on the identified type of data packet.

In various embodiments, processing device 202 also includes frequency, phase, and timing tracker 214 which is configured to perform one or more offset values, as may have been identified by the packet synchronizers. Accordingly, frequency, phase, and timing tracker 214 may modify or adjust frequency, phase, and timing values associated with the received samples based on one or more shift values or offset values generated by the packet synchronizers.

Processing device 202 additionally includes despreader 216 which is configured to perform one or more despreading operations. In various embodiments, despreading operations may be performed if one or more spread-spectrum techniques were used to transmit the data packet. Accordingly, the despreading operations may be performed to reconstitute the received data to its original bandwidth. In some embodiments, the despreading operations performed by despreader 216 are performed optionally, and based on a type of data packet identified by packet type identifier 212. For example, if packet type identifier 212 identifies the data packet as being a Bluetooth Low Energy Long Range data packet, despreader 216 may be selected, and despreading operations may be performed. However, if the data packet is identified as being a Bluetooth Low Energy or Bluetooth Low Energy 2 data packet, despreader 216 may be bypassed, and despreading operations are not performed.

In various embodiments, processing device 202 further includes demodulator 218 which is configured to perform one or more demodulation operations. Accordingly, encoded data included in received data packets may be decoded by, at least in part, demodulator 218, and an output of demodulator may be provided to other system components for data processing. As shown in FIG. 2, one or more data values may be received from either despreader 216 or frequency, phase, and timing tracker 214, as determined based on the type of data packet identified by packet type identifier 212. The demodulated data values may be provided to decoder 220 discussed in greater detail below, or may be provided to an additional downstream component of the receive chain.

Processing device 202 additionally includes decoder 220 which is configured to perform one or more decoding operations. In various embodiments, the decoding operations may be convolutional decoding operations. Accordingly, if a convolutional encoding technique was used to encode data values included in the data packet, the convolutional decoding operations may be performed to decode them. As similarly discussed above, decoding operations performed by decoder 220 are performed optionally, and based on a type of data packet identified by packet type identifier 212. For example, if packet type identifier 212 identifies the data packet as being a Bluetooth Low Energy Long Range data packet, decoder 220 may be selected, and convolutional decoding operations may be performed. However, if the data packet is identified as being a Bluetooth Low Energy or Bluetooth Low Energy 2 data packet, decoder 220 may be bypassed, and convolutional decoding operations are not performed.

Figure 3:
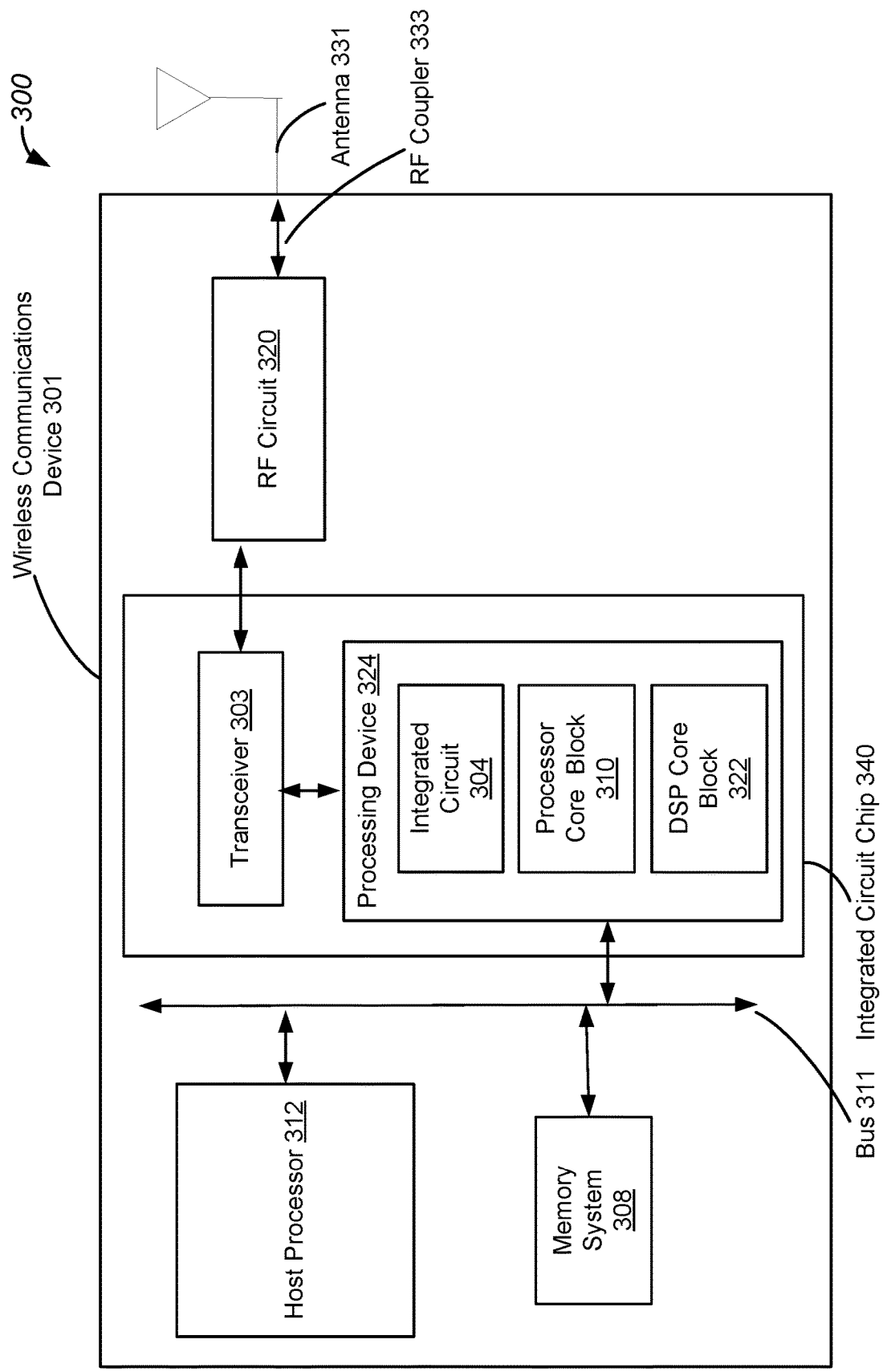
FIG. 3 illustrates an example of another system for demodulation for wireless communications devices, configured in accordance with some embodiments.

FIG. 3 illustrates an example of another system for demodulation for wireless communications devices, configured in accordance with some embodiments. More specifically, FIG. 3 illustrates an example of a system, such as system 300, that may include wireless communications device 301. It will be appreciated that wireless communications device 301 may be one of any of first devices 110 or second devices 120 discussed above. In various embodiments, wireless communications device 301 includes a transceiver, such as transceiver 303, which may be a transceiver such as transceivers 106 and 124 discussed above. In one example, system 300 includes transceiver 303 which is configured to transmit and receive signals using a communications medium that may include antenna 331. Accordingly, transceiver 303 may include a transmitter having one or more components forming a portion of a transmit path, and may also include a receiver having one or more components forming a portion of a receive path.

As noted above, transceiver 303 may be included in a Bluetooth radio, and may be compatible with a Bluetooth communications protocol and multiple Bluetooth operational modes. Accordingly, packets disclosed herein may be Bluetooth packets. In some embodiments, the packets may be Bluetooth Low Energy packets. Accordingly, as will be discussed in greater detail below, components of a receive chain used to receive, demodulate, and decode data values included in a data packet may be included in transceiver 303 as well as processing device 324 discussed in greater detail below. For example, transceiver 303 may include one or more analog buffers and filters included in a receive chain.

System 300 additionally includes processing device 324 which may include one or more processor cores. In some embodiments, processing device 324 may be configured to implement a controller. In various embodiments, processing device 324 includes one or more components configured to implement a medium access control (MAC) layer that is configured to control hardware associated with a wireless transmission medium, such as that associated with a Bluetooth transmission medium. Processing device 324 may also include one or more components configured to implement a physical layer (PHY layer) of the Bluetooth protocol. In one example, processing device 324 may include processor core block 310 that may be configured to implement a driver, such as a Bluetooth driver. Processing device 324 may further include digital signal processor (DSP) core block 322 which may be configured to include microcode.

In various embodiments, processor core block 310 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack and a controller stack are implemented using at least processor core block 310. The host stack is configured to include layers for a Bluetooth network encapsulation protocol, radio frequency communication, service discovery protocol, as well as various other high-level data layers. The controller stack is configured to include a link management protocol, a host controller interface, a link layer which may be a low energy link layer, as well as various other timing critical layers.

In various embodiments, system 300 further includes integrated circuit 304 which may include processing logic implemented using circuitry and/or one or more processor cores. In various embodiments, processing logic may be implemented in firmware of integrated circuit 304. Accordingly, integrated circuit 304 is configured to implement one or more components of processing device 324, such as the packet synchronizers, demodulators, and decoders discussed above. In some embodiments, such components may be implemented with other portions of the PHY layer in processor core block 310. Thus, integrated circuit 304 may include one or more components that are configured to perform demodulation operations discussed above and that will be described in greater detail below. While FIG. 3 illustrates integrated circuit 304 as separate from processor core block 310 discussed below, it will be appreciated that integrated circuit 304 may be implemented as part of processor core block 310 and may be included within processor core block 310.

System 300 further includes radio frequency (RF) circuit 320 which is coupled to antenna 331. In various embodiments, RF circuit 320 may include various components such as an RF switch, a diplexer, and a filter. While FIG. 3 illustrates system 300 as having a single antenna, it will be appreciated that system 300 may have multiple antennas. Accordingly, RF circuit 320 may be configured to select an antenna for transmission/reception, and may be configured to provide coupling between the selected antenna, such as antenna 331, and other components of system 300 via a bus, such as bus 311.

System 300 includes memory system 308 which may include one or more memory devices configured to store one or more data values associated with timing computations discussed above and in greater detail below. Accordingly, memory system 308 includes storage device, which may be a non-volatile random access memory (NVRAM) configured to store such data values, and may also include a cache that is configured to provide a local cache. In various embodiments, system 300 further includes host processor 312 which is configured to perform processing operations associated with system 300.

It will be appreciated that one or more of the above-described components may be implemented on a single chip, or on different chips. For example, transceiver 303 and processing device 324 may be implemented on the same integrated circuit chip, such as integrated circuit chip 340. In another example, transceiver 303 and processing device 324 may each be implemented on their own chip, and thus may be disposed separately as a multi-chip module or on a common substrate such as a printed circuit board (PCB). It will also be appreciated that components of system 300 may be implemented in the context of a low energy device, a smart device, an IoT device, or a vehicle such as an automobile. Accordingly, some components, such as integrated chip 340, may be implemented in a first location, while other components, such as antenna 331, may be implemented in second location, and coupling between the two may be implemented via a coupler such as RF coupler 333.

Figure 4:
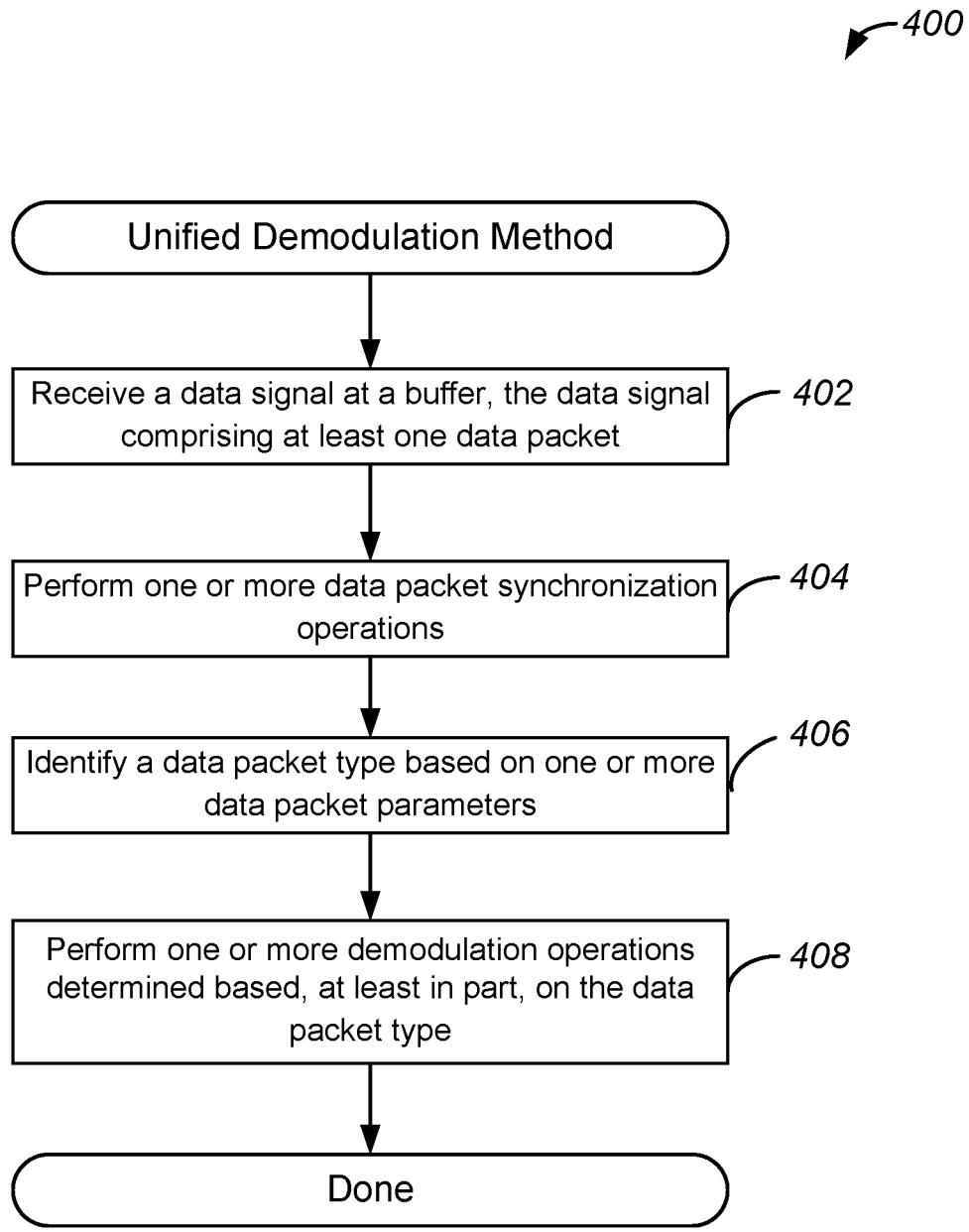
FIG. 4 illustrates an example of a method for demodulation for wireless communications devices, implemented in accordance with some embodiments.

FIG. 4 illustrates an example of a method for demodulation for wireless communications devices, implemented in accordance with some embodiments. As discussed above, wireless communications devices may include various components, such as processing devices that are configured to perform various operations associated with data packet reception, detection, synchronization, and demodulation. Accordingly, as will be discussed in greater detail below, a method, such as method 400, may be implemented to perform unified demodulation operations for multiple operational modes of a wireless communications protocol.

Method 400 may perform operation 402, during which a data signal may be received at a buffer, the data signal including at least one data packet. As similarly discussed above, the data signal may be transmitted from a first wireless communications device and may be received at a second wireless communications device, and the data signal may be sent in accordance with an operational mode of a wireless communications protocol. As also noted above, digital samples of the data packet may be stored in a buffer at the receiving device.

Method 400 may perform operation 404, during which one or more data packet synchronization operations may be performed. In various embodiments, the one or more data packet synchronization operations are performed by multiple data packet synchronizers associated with different operational modes of a communications protocol. Accordingly, during operation 404, multiple data packet synchronizers may perform one or more synchronization operations in accordance with an appropriate communications protocol, and a result of such data packet synchronization operations may be the identification of one or more data packet parameters, such as a size of a section of the received data packet.

Method 400 may perform operation 406, during which a data packet type may be identified based on one or more data packet parameters. In various embodiments, one or more features of the data packet may be identified and used to identity a type of the data packet. As discussed above, one or more sections of the data packet may be identified, and a size of the one or more sections may be used to identify the packet type. More specifically, a size of the section may be determined, and the size may be mapped to a particular operational mode of a communications protocol based on a mapping that may be designated by communications protocol specifications.

Method 400 may perform operation 408, during which one or more demodulation operations may be performed. As similarly discussed above, the one or more demodulation operations are determined based on the identified data packet type. Accordingly, during operation 408, a sequence of demodulation operations and associated operations may be identified based on the identified data packet type, and the one or more components of the receive chain may be selected to perform the demodulation operations and associated operations in accordance with the appropriate communications protocol for the identified data packet type.

Figure 5:
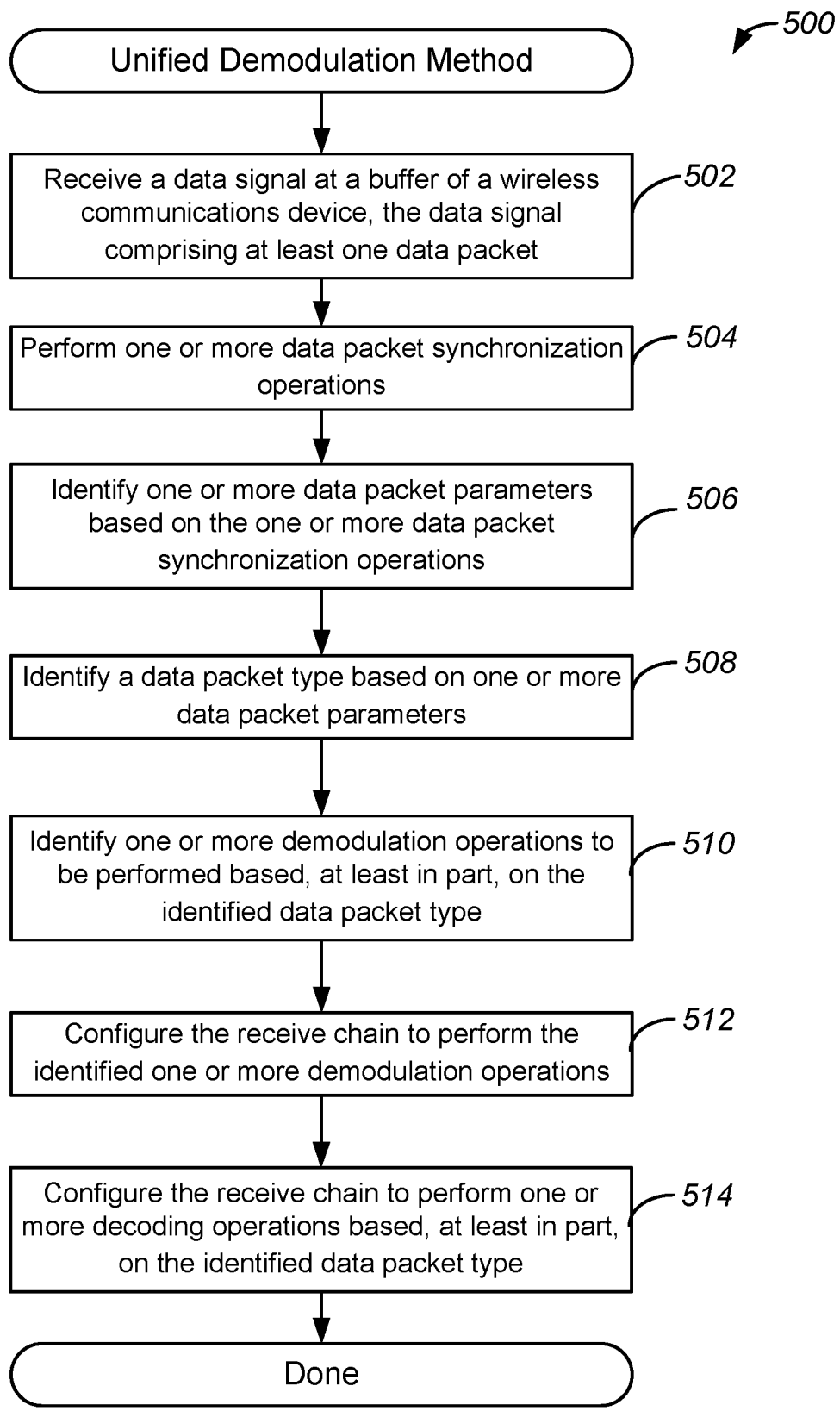
FIG. 5 illustrates an example of another method for demodulation for wireless communications devices, implemented in accordance with some embodiments.

FIG. 5 illustrates an example of another method for demodulation for wireless communications devices, implemented in accordance with some embodiments. As discussed above, wireless communications devices are configured to perform various operations associated with data packet reception, detection, synchronization, and demodulation. Accordingly, as will be discussed in greater detail below, a method, such as method 500, may be implemented to selectively perform synchronization operations, demodulation operations, and decoding operations using a unified receive chain of components, thus enabling the efficient handling of demodulation operations for multiple operational modes of a wireless communications protocol.

Method 500 may perform operation 502, during which a data signal may be received at a buffer. In various embodiments, the data signal includes at least one data packet. As similarly discussed above, the data signal may be transmitted from a first wireless communications device and may be received at a second wireless communications device, and the data signal may be sent in accordance with an operational mode of a wireless communications protocol. As also noted above, digital samples of the data packet may be stored in a buffer at the receiving device.

Method 500 may perform operation 504, during which one or more data packet synchronization operations may be performed. As noted above, the one or more data packet synchronization operations are performed by multiple data packet synchronizers associated with different operational modes of a communications protocol. Accordingly, during operation 504, multiple data packet synchronizers may perform one or more synchronization operations in accordance with an appropriate communications protocol, and a result of such data packet synchronization operations may be the identification of one or more sections of the data packet as well as a size of such sections of the received data packet. As noted above, the data packet synchronizers may be Bluetooth Low Energy, Bluetooth Low Energy Long Range, or Bluetooth Low Energy 2 data packet synchronizers.

Method 500 may perform operation 506, during which one or more data packet parameters may be identified based on the one or more data packet synchronization operations. More specifically, the sizes of sections described above may be used to identify data packet parameters. For example, a size of a particular section or sections of the data packet may be used as data packet parameters. In one example, the section may be an access address or may be a preamble. Accordingly, during operation 506, a size of an access address or a preamble of the data packet may be determined and identified as data packet parameters.

Method 500 may perform operation 508, during which a data packet type may be identified based on one or more data packet parameters. As discussed above, one or more features of the data packet may be identified and used to identity a type of the data packet. More specifically, the data packet parameters may be used to look up a particular data packet type. Thus, one or more sections of the data packet, such as a section that stores the access code, may be identified. Moreover, a size of the section may be used to identify the packet type. More specifically, a size of the section may be determined, and the size may be mapped to a particular operational mode of a communications protocol. In various embodiments, different operational modes and different communications protocols have different designated sized access address sections, and a designated mapping, as may be determined by communications protocol specifications, may be used to look up a communications protocol and associated operational mode based on a given access address size. In some embodiments, the data packet parameters may be the size of the data packet preamble. For example, a Bluetooth Low Energy data packet may have a preamble of 8 bits, a Bluetooth Low Energy 2 data packet may have a preamble of 16 bits, and a Bluetooth Low Energy Long Range data packet may have a preamble of 80 bits.

Method 500 may perform operation 510, during which one or more demodulation operations may be identified. In various embodiments, the one or more demodulation operations are determined based on the identified data packet type. Accordingly, during operation 510, a sequence of demodulation operations and associated operations may be identified based on the identified data packet type, and the one or more components of the receive chain may be selected to perform the demodulation operations and associated operations in accordance with the appropriate communications protocol for the identified data packet type.

In various embodiments, the identification of the demodulation operations includes determining whether or not despreading operations should be performed. As discussed above with reference to FIG. 2, a despreader may be utilized for some operational modes while bypassed for other operational modes. More specifically, despreader may be selected for a Bluetooth Low Energy Long Range operational mode, while bypassed for other operational modes, such as Bluetooth Low Energy and Bluetooth Low Energy 2 operational modes. Accordingly, the identification of demodulation operations may include the determination of whether or not they will include despreading operations.

Method 500 may perform operation 512, during which one or more components of the receive chain may be configured to perform the identified demodulation operations. Accordingly, during operation 512, one or more components of the receive chain, such as a demodulator, may be selected to perform the demodulation operation in accordance with the appropriate communications protocol for the identified data packet type. As noted above, a despreader may have optionally been selected based on the identified data packet type. Accordingly, during operation 512, demodulation operations may be performed or, if appropriate, despreading and demodulation operations may be performed.

Method 500 may perform operation 514, during which one or more components of the receive chain may be configured to perform the identified decoding operations. In various embodiments, the one or more decoding operations are determined based on the identified data packet type. Accordingly, during operation 514, a decoding operation may be identified based on the identified data packet type, and the one or more components of the receive chain may be selected to perform the decoding operation in accordance with the appropriate communications protocol for the identified data packet type.

As similarly noted above, the identification of the decoding operations includes determining whether or not a particular decoder should be utilized. As discussed above with reference to FIG. 2, a decoder may be utilized for some operational modes while bypassed for other operational modes. More specifically, a convolutional decoder may be selected for a Bluetooth Low Energy Long Range operational mode, while bypassed for other operational modes, such as Bluetooth Low Energy and Bluetooth Low Energy 2 operational modes. Accordingly, the identification of decoding operations may include the determination of whether or not they will include convolutional decoding operations.

Figure 6:
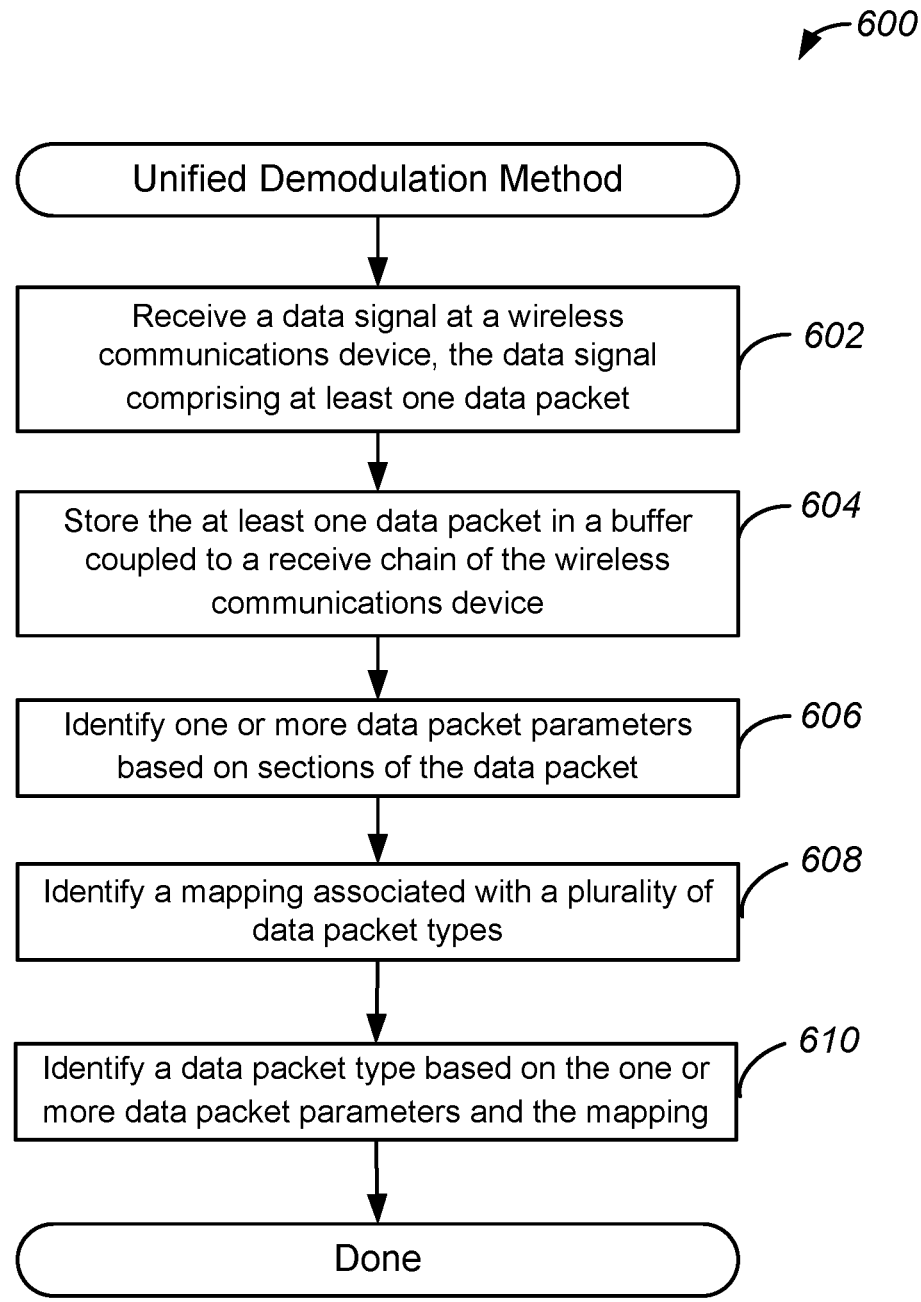
FIG. 6 illustrates an example of yet another method for demodulation for wireless communications devices, implemented in accordance with some embodiments.

FIG. 6 illustrates an example of yet another method for demodulation for wireless communications devices, implemented in accordance with some embodiments. As discussed above, wireless communications devices are configured to perform various operations associated with data packet reception, detection, synchronization, and demodulation. Accordingly, as will be discussed in greater detail below, a method, such as method 600, may be implemented to identify a data packet type thus enabling the selective performance of synchronization operations, demodulation operations, and decoding operations using a unified receive chain of components.

Method 600 may perform operation 602, during which a data signal may be received that includes at least one data packet. As similarly discussed above, the data signal may be transmitted from a first wireless communications device and may be received at a second wireless communications device, and the data signal may be sent in accordance with an operational mode of a wireless communications protocol. As also noted above, digital samples of the data packet may be stored in a buffer at the receiving device.

Method 600 may perform operation 604, during which a plurality of samples of the at least one data packet may be stored in a buffer. As also discussed above, the samples may be digital samples received from one or more components of a receive chain in a transceiver. The samples may be stored in a region of the buffer that is configured to have a size determined based on one or more data packet parameters associated with a communications protocol. For example, the buffer may have a size configured to store a largest preamble and access address of one or more operational modes for that communications protocol. In various embodiments, the size of the buffer may be configured during one or more initialization and configuration operations.

Method 600 may perform operation 606, during which one or more packet parameters may be identified based one or more sections of the data packet. As similarly discussed above, the one or more packet parameters may include a size of one or more sections of the data packet. For example, the one or more data packet parameters may include a size of an access address of the received data packet. Accordingly, in various embodiments, the buffer is configured to identify a size of a section of a data packet stored in the buffer and generate packet parameters based on such identified size.

Method 600 may perform operation 608, during which a mapping associated with a plurality of data packet types may be identified. In various embodiments, a mapping associated with data packet types may have been previously stored in memory. Accordingly, the one or more packet parameters may be used to look up a particular operational mode of a particular communications protocol. More specifically, the packet parameter may be a size of a section of a data packet, as noted above. The size of the section of the data packet may be specified by a communications protocol specification, and may thus be used to look up an operational mode in the mapping for the given size of that section.

Method 600 may perform operation 610, during which a data packet type may be identified based on the one or more data packet parameters and the mapping. Accordingly, based on the look up operation in the mapping discussed above, a particular operational mode of a particular communications protocol may be identified, and one or more output values may be generated identifying the particular operational mode and communications protocol. In this way, samples may be received by the buffer, and data packet types may be identified dynamically.

Figure 7A:
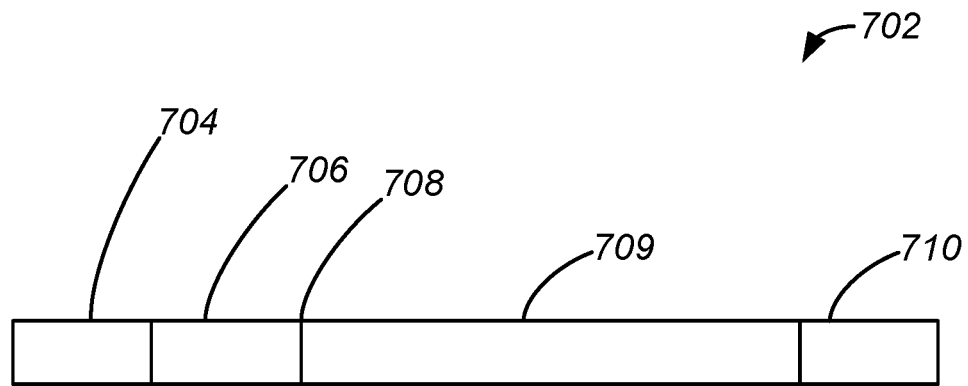
FIG. 7A illustrates an example of a diagram of a data packet, implemented in accordance with some embodiments.

FIG. 7A illustrates an example of a diagram of a data packet, implemented in accordance with some embodiments. As shown in FIG. 7A, a data packet, such as data packet 702 may have multiple sections that each have a particular length or size, as may be determined by a communications protocol specification. More specifically, preamble 704 may have a designated size, such as 8 bits, and access address 706 may have a designated size, such as 32 bits. Both sized may be determined by the communications protocol specification. Accordingly, when data packet 702 is received at a buffer and stored, the buffer may identify a storage location at the end of access address 706, such as location 708, and may identify a size of both preamble 704 and access address 706. As will be discussed in greater detail below with reference to FIG. 7B, such sizes may vary based on an operational mode of a communications protocol that is used. Accordingly, such identified sizes may be used by the buffer to identify the operational mode of the communications protocol in accordance with method 600 discussed above. In various embodiments, data packet 702 may have additional sections, such as payload 709 and cyclic redundancy check (CRC) bits 710.

Figure 7B:
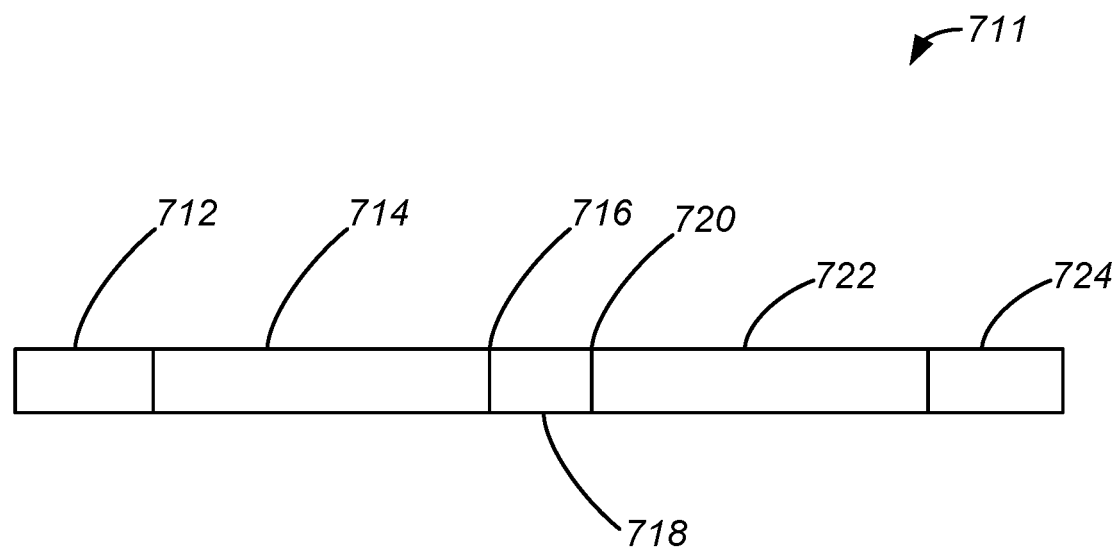
FIG. 7B illustrates another example of a diagram of a data packet, implemented in accordance with some embodiments.

FIG. 7B illustrates another example of a diagram of a data packet, implemented in accordance with some embodiments. As similarly discussed above, a data packet, such as data packet 711 may have multiple sections that each have a particular length or size, as may be determined by a communications protocol specification. More specifically, preamble 712 may have a designated size, such as 80 bits, and access address 714 may have a designated size, such as 256 bits, both of which may be determined by the communications protocol specification. As noted above, such sizes may vary based on an operational mode of a communications protocol that is used, and the buffer may check location 716 to determine a total size of preamble 712 and access address 714 for such purposes. More specifically, preamble 712 and access address 714 have larger sizes than the preamble and access address discussed above with reference to FIG. 7A. Accordingly, such differences in identified sizes may be used by the buffer to identify the operational mode of the communications protocol.

Moreover, as shown in FIG. 7B, data packet 711 may also include rate indicator bits 718 which may have a designated size, such as 40 bits. If such a section is included in data packet 711, the bits included in such a section may be used to further identify a type of Bluetooth Low Energy Long Range data packet. More specifically, such rate indicator bits 718 may be used to determine if the data packet is a Bluetooth Low Energy Long Range S2 (500 kbps) or S8 (125 kbps) data packet. Accordingly, the buffer may check location 720 to determine if such bits are included, and such a determination may also be used as data packet parameters used to identify a data packet type, as discussed above. In various embodiments, data packet 711 may have additional sections, such as payload 722 and CRC bits 724.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   receiving, at a buffer of a wireless communications device, a data packet;
   performing, using a processing device, one or more synchronization operations based on one or more operational modes of a wireless communications protocol;
   identifying, using the processing device, a type of the data packet; and
   configuring, using the processing device, a receive chain of the wireless communications device to perform a type of demodulation operation selected based on an identified wireless communications protocol of the identified type of the received data packet.

2. The method of claim 1, wherein the performing of the one or more synchronization operations comprises:
   selecting one or more packet synchronizers for the one or more synchronization operations.

3. The method of claim 1, wherein the type of data packet is selected from a group consisting of: a Bluetooth Low Energy data packet and a Bluetooth Low Energy Long Range data packet.

4. The method of claim 1, wherein the configuring of the receive chain to perform a type of demodulation operation comprises:
- determining whether a despreading operation should be performed; and
- determining whether a decoding operation should be performed.

5. The method of claim 4, wherein the despreading operation is performed if the data packet is a Bluetooth Low Energy Long Range data packet, and wherein the despreading operation is not performed if the data packet is a Bluetooth Low Energy data packet.

6. The method of claim 4, wherein the decoding operation is a convolutional decoding operation, wherein the decoding operation is performed if the data packet is a Bluetooth Low Energy Long Range data packet, and wherein the decoding operation is not performed if the data packet is a Bluetooth Low Energy data packet.

7. The method of claim 1, wherein the identifying of the type of data packet comprises:
- determining a length of one or more sections of the data packet; and
- identifying a type of the data packet based, at least in part, on the determined length of the one or more sections of the data packet.

8. The method of claim 1, wherein the data packet is a Bluetooth Low Energy 2 data packet.

9. The method of claim 1, wherein the wireless communications device is included in a sensor.

10. A wireless communications device comprising:
- a buffer configured to store one or more data values of a data packet; and
- processing logic configured to:
  - perform one or more synchronization operations based on one or more operational modes of a wireless communications protocol;
  - identify a type of the data packet based, at least in part, on the one or more synchronization operations; and
  - configure a receive chain of the wireless communications device to perform a type of demodulation operation selected based on an identified wireless communications protocol of the identified type of the received data packet.

11. The wireless communications device of claim 10, wherein the processing logic is further configured to:
- select one or more packet synchronizers for the one or more synchronization operations.

12. The wireless communications device of claim 10, wherein the type of data packet is selected from a group consisting of: a Bluetooth Low Energy data packet and a Bluetooth Low Energy Long Range data packet.

13. The wireless communications device of claim 10, wherein the processing logic is further configured to:
- determine whether a despreading operation should be performed; and
- determine whether a decoding operation should be performed.

14. The wireless communications device of claim 13, wherein the decoding operation is a convolutional decoding operation, wherein the despreading operation and the decoding operation are performed if the data packet is a Bluetooth Low Energy Long Range data packet, and wherein the despreading operation and the decoding operation are not performed if the data packet is a Bluetooth Low Energy data packet.

15. The wireless communications device of claim 10, wherein the processing logic is implemented in firmware of the wireless communications device.

16. A system comprising:
- a processor;
- a memory;
- an antenna configured to receive a data transmission comprising a data packet;
- processing logic configured to:
  - perform one or more synchronization operations based on one or more operational modes of a wireless communications protocol;
  - identify a type of the data packet based, at least in part, on the one or more synchronization operations; and
  - configure a receive chain to perform a type of demodulation operation selected based on an identified wireless communications protocol of the identified type of the received data packet.

17. The system of claim 16, wherein the processing logic is further configured to:
- select one or more packet synchronizers for the one or more synchronization operations.

18. The system of claim 16, wherein the type of data packet is selected from a group consisting of: a Bluetooth Low Energy data packet and a Bluetooth Low Energy Long Range data packet.

19. The system of claim 16, wherein the processing logic is further configured to:
- determine whether a despreading operation should be performed; and
- determine whether a decoding operation should be performed.

20. The system of claim 19, wherein the decoding operation is a convolutional decoding operation, wherein the despreading operation and the decoding operation are performed if the data packet is a Bluetooth Low Energy Long Range data packet, and wherein the despreading operation and the decoding operation are not performed if the data packet is a Bluetooth Low Energy data packet.

* * * * *